United States Patent [19]

Shu et al.

[11] Patent Number: 4,804,043
[45] Date of Patent: Feb. 14, 1989

[54] PROCESS FOR SELECTIVE PLACEMENT OF POLYMER GELS FOR PROFILE CONTROL IN THERMAL OIL RECOVERY

[75] Inventors: Paul Shu, Princeton Junction, N.J.; Winston R. Shu, Dallas, Tex.

[73] Assignee: Mobil Oil Corp., New York, N.Y.

[21] Appl. No.: 68,290

[22] Filed: Jul. 1, 1987

[51] Int. Cl.$^4$ ............ E21B 33/138; E21B 43/24; E21B 43/243

[52] U.S. Cl. ............ 166/263; 166/261; 166/270; 166/272; 166/288; 166/295; 166/300; 166/303

[58] Field of Search ............ 166/261, 263, 270, 272, 166/288, 295, 300, 303; 523/130

[56] References Cited

U.S. PATENT DOCUMENTS

| | | | |
|---|---|---|---|
| Re. 30,767 | 10/1981 | Felber et al. | 166/288 X |
| 2,786,530 | 3/1957 | Maly | 166/263 |
| 3,198,249 | 8/1965 | Willman | 166/261 X |
| 3,455,392 | 7/1969 | Prats | 166/303 |
| 3,669,188 | 6/1972 | Coles et al. | 166/288 X |
| 3,993,133 | 11/1976 | Clampitt | 166/288 X |
| 4,140,183 | 2/1979 | Holm | 166/263 X |
| 4,440,228 | 4/1984 | Swanson | 166/274 |
| 4,482,015 | 11/1984 | Falk | 166/288 |
| 4,485,875 | 12/1984 | Falk | 166/270 X |
| 4,665,986 | 5/1987 | Sandiford | 166/303 X |
| 4,743,633 | 5/1988 | Navratil et al. | 523/130 |

Primary Examiner—George A. Suchfield
Attorney, Agent, or Firm—Alexander J. McKillop; Charles J. Speciale; Lawrence O. Miller

[57] ABSTRACT

High permeable thermally fluid swept zones in an oil containing formation are selectively plugged by a high temperature selective gel-forming solution without plugging the less permeable unswept portion of the formation. Ungelled solution in the less permeable unswept portion of the formation in the vicinity of the injection well is removed and a thermal fluid is injected into the formation that sweeps oil from the less permeable, unswept portion of the formation, thereby resulting in more complete displacement of oil from the formation.

18 Claims, 3 Drawing Sheets

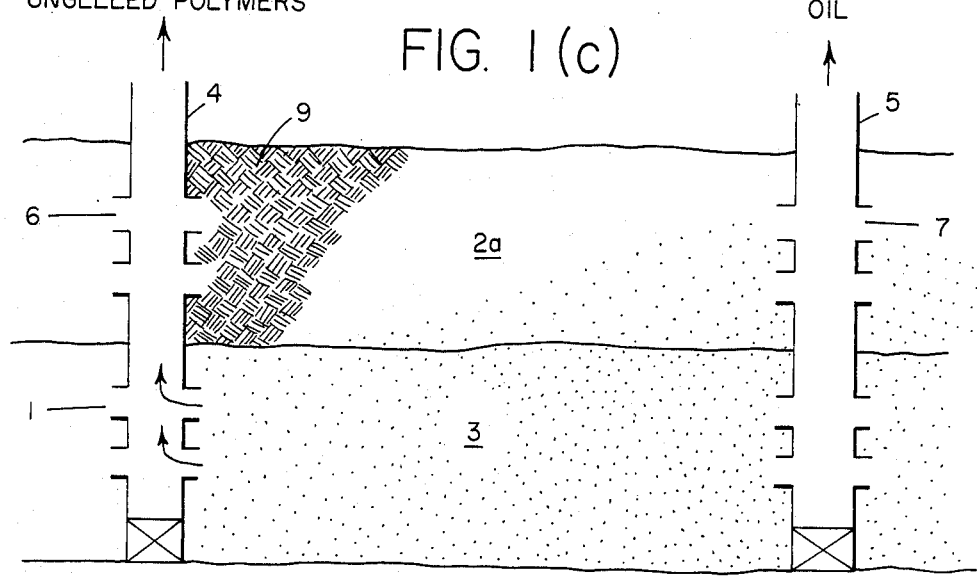
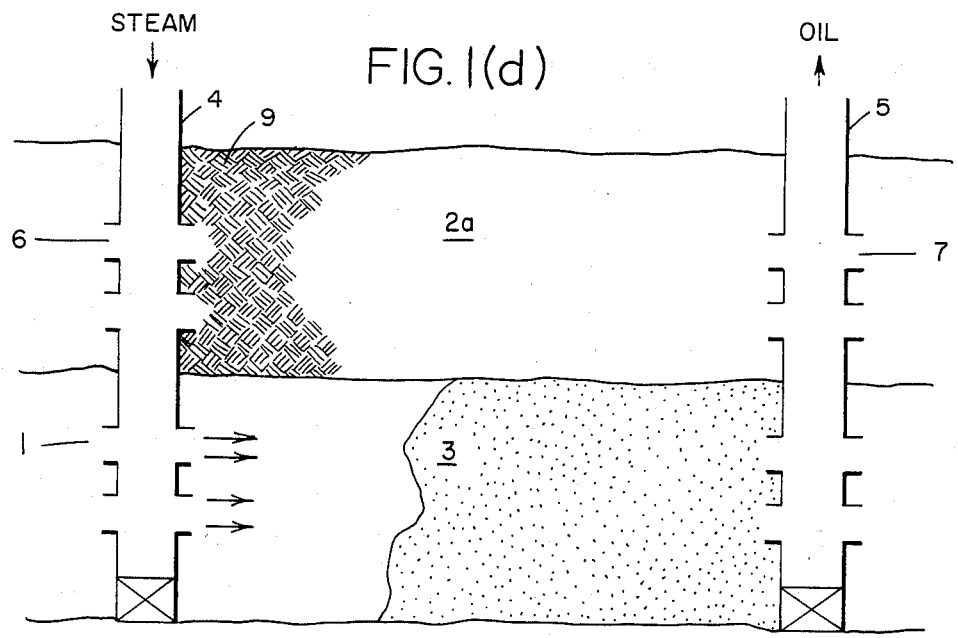

TEMPERATURE DISTRIBUTION FOR STEAMFLOOD

PROCESS FOR SELECTIVE PLACEMENT OF POLYMER GELS FOR PROFILE CONTROL IN THERMAL OIL RECOVERY

FIELD OF THE INVENTION

This invention relates to the recovery of oil from subterranean, viscous oil containing formations containing zones of varying permeabilities wherein the sweep efficiency in a steam flooding, cyclic steam stimulation, in-situ combustion or other high temperature operation is improved by injecting a temperature selective gel-forming solution into the formation that selectively plugs the highly permeable zones of the formation without plugging the less permeable zones of the formation.

BACKGROUND OF THE INVENTION

In thermal oil recovery processes, channeling and override of injected fluids such as steam are common problems. Channeling can be caused by high permeability zones (thief zones) which can exist in the reservoir or, it can be caused by the high mobility ratio of the displacing fluid to the displaced fluid. The override effect occurs because of the density differences between the injected fluid and the oil. When either of these phenomena occurs, the injected fluid tends to breakthrough early at the production wells and bypass a considerable volume of the oil in the reservoir thereby resulting in inefficient oil recovery.

U.S. Pat. No. 4,074,757 to Felber et al. disclose a method of selective plugging of undesirable high permeability streaks and channels in oil bearing reservoirs during high temperature (250° F. or higher) injection recovery processes such as steam flooding, underground combustion flooding or a naturally occurring high temperature reservoir, or the like. Improved sweep efficiency is obtained by injecting a gel-forming solution consisting essentially of sodium or ammonium lignosulfonate and water or brine in the absence of other gelation promoters and then allowing the high temperatures of the underground formation to promote gelation. To ensure that the injected gel-forming solution is confined largely to the high permeability zone of the formation, it is necessary to isolate the offending, high-permeability zone by one or more packers or plug back procedures. However, this method does not ensure that there is no tendency for the gel-forming solution to flow into the low permeability zones of the formation. Other U.S. patents teaching the use of polymers that are injected as monomer solutions and polymerize in-situ to effect plugging of highly permeable zones include U.S. Pat. No. 4,637,467 to Shaw et al. and U.S. Pat. No. 4,461,351 to Falk. These processes are not selective because the monomers before they polymerize can penetrate into high as well as the low permeability zones of the formation and packers are required to inject the monomer into selected portions of the formation.

The present invention provides a method by which the high-permeable thermal fluid swept zones of a formation are selectively plugged by temperature selective gel-forming solutions without plugging the less permeable unswept portion of the formation thereby allowing further thermal fluid injection to sweep the less permeable unswept portion of the formation resulting in more complete displacement of oil from the formation.

SUMMARY OF THE INVENTION

Our invention involves a method for recovering oil from a subterranean, viscous oil-containing formation having relatively high permeability zones and relatively lower permeability zones penetrated by at least one injection well and at least one spaced-apart production well, said wells being in fluid communication with a substantial portion of the formation. Initially, a high temperature flooding medium including steam flooding and in-situ combustion or other high temperature flooding medium is injected into the formation via the injection well and fluids including oil are recovered from the formation via the production well until breakthrough of the high temperature flooding medium occurs at the projection well thereby forming a thermally-swept zone in the relatively high permeability zones of the formation that have a higher temperature than the unswept portions of the formation. Thereafter, a predetermined amount of a temperature selective gel-forming solution is injected into the formation via the injection well in sufficient amount to flow into the high permeability thermally-swept zones and sufficient time is allowed for the injected solution to form a rigid gel in the high permeability zones thereby plugging these zones. Thereafter, the injection well is put on production to remove the ungelled gel-forming solution from the unswept low permeability zones in the vicinity of the injection well. After the ungelled portion of the gel-forming solution is removed from the formation in the vicinity of the injection well, injection of the high temperature flooding medium into the formation via the injection well is resumed and fluids including oil are recovered from the formation via the production well. The gel-forming solution comprises a polymer system composed of polymers and appropriate additives which control the kinetic rate of gel formation in the reservoir formation. Suitable gel-forming solutions comprise aqueous solutions of high molecular weight polyacrylamide with 30% or less hydrolysis, mixed with phenol and formaldehyde.

In another embodiment, the process of our invention may also be applied to a steam drive oil recovery process in any formation wherein injected steam channels through the top of the formation to form a steam-swept zone, referred to as steam override. Once steam breakthrough occurs at the production well thereby forming a steam-swept zone in the formation, injection of steam is terminated and a predetermined amount of a temperature selective gel-forming solution is injected into the formation that preferentially enters the steam-swept zone. Thereafter, sufficient time is allowed to permit the gel-forming solution to form a rigid gel in the steam-swept zone thereby effectively plugging the steam-swept zone. Thereafter, the injection well is put on production to remove the ungelled solution and steam injection into the formation is resumed and fluids including oil are recovered from the formation through the production well. Once steam breakthrough has again occurred at the production well, another predetermined amount of temperature selective gel-forming solution is injected into the formation and allowed to set for a predetermined period of time to form a rigid gel in the previously steam-swept zone. Ungelled solution is again removed from the formation via the injection well and steam injection can once again be initiated to further sweep oil from the formation below the second slug of gel-forming solution. The process should be continued through repetitious cycles thereby resulting in sweeping oil from a very significant percentage of the formation.

In an additional embodiment, the process of our invention may be applied to a cyclic steam stimulation heavy oil recovery process. In this embodiment, a subterranean, viscous oil-containing formation having relatively high permeability zones and relatively low permeability zones is penetrated by at least one well that is in fluid communication with a substantial portion of the formation. Initially, a predetermined amount of steam is injected into the formation via the well that preferentially enters the high permeability zones to form steam-swept zones in the formation. Thereafter, fluids, including oil, are produced from the formation via the well until the amount of oil recovered is unfavorable. Thereafter, a predetermined amount of a temperature selective gel-forming solution is injected into the formation via the well in sufficient amount to flow into the steam-swept zones and the solution is allowed to set in the steam-swept zones for a sufficient time period to form a rigid gel therein, thereby plugging the steam-swept zones. Ungelled gel-forming solution is recovered from the formation via the well and a predetermined amount of steam is injected into the formation via the well that preferentially enters the low permeable unswept portion of the formation. Thereafter, fluids, including oil, are produced from the formation via the well until the amount of oil recovered is unfavorable.

BRIEF DESCRIPTION OF THE DRAWING

FIGS. 1(a), 1(b), 1(c) and 1(d) illustrate a steam flooding oil process in a formation containing zones of varying permeabilities using the method of the present invention.

FIG. 1(a) shows injected steam selectively entering the highly permeable upper zone of a subterranean oil-containing formation;

FIG. 1(b) shows injection of a temperature selective gel-forming solution into the formation that is allowed to form a rigid gel in the steam-swept portion of the formation;

FIG. 1(c) shows how ungelled polymers are removed from the lower portion of the formation in the vicinity of the injection well by putting the injection well on production, and FIG. 1(d) shows how the lower portion of the formation is steam swept by additional injection of steam.

DESCRIPTION OF THE PREFERRED EMBODIMENTS

The process of our invention concerns an improvement in the sweep efficiency of a thermal oil recovery process by injecting a steam flooding medium, in-situ combustion medium, or other high temperature flooding medium into a viscous, oil-containing formation that tends to channel through relatively high permeability zones in the formation to form a thermally-swept zone, thereafter injecting a temperature selective gel-forming solution into the formation that forms a rigid gel in the thermally swept zones of the formation without rigid gelling in the less permeable zones of the formation, removing ungelled polymer from the less permeable unswept portion of the formation in the vicinity of the injection well and thereafter resuming steam flooding or in-situ combustion in the formation and recovering oil. In addition, the process may also be used in a steam drive process wherein steam override occurs or in a steam cyclic stimulation process.

Figure 1A:
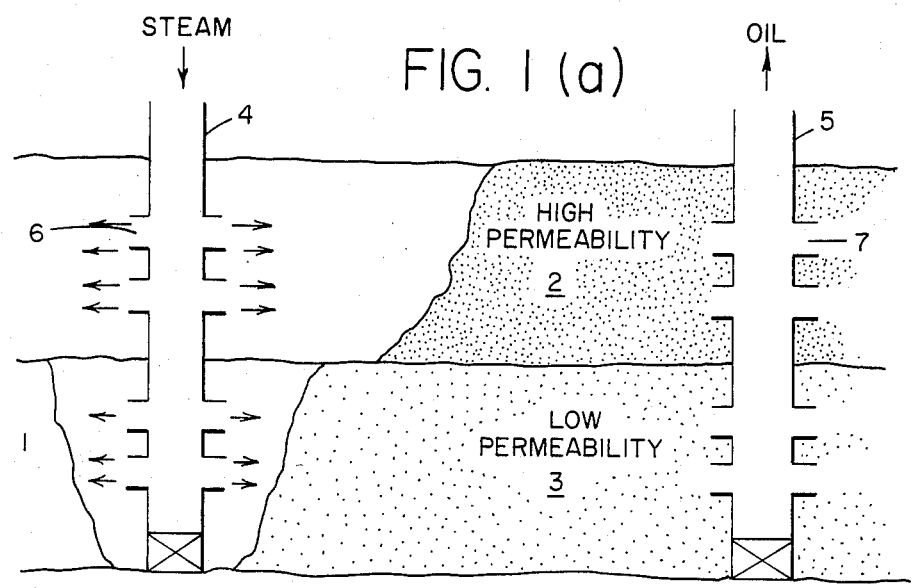

For formation containing zones of varying permeabilities, the process of our invention is best understood by referring to the attached figures in which FIG. 1(a) illustrates how a subterranean, viscous oil-containing formation 1, containing an upper high permeability zone 2 and a lower, low permeability zone 3, and penetrated by an injection well 4 and a spaced-apart production well 5, responds to a normal steam flood. Steam is injected into injection well 4, passes through perforations 6, and then into the viscous, oil-containing formation 1. Conventional practice is to perforate or establish fluid flow communications between the well and the formation throughout the full vertical thickness of the formation, both with respect to the injection well 4 and production well 5. The injected steam heats the oil thereby reducing its viscosity and displaces the mobilized oil through the formation 1 toward production well 5 from which it is recovered through perforations 7 in the production well. Injection of steam into the injection well and production of fluids including oil from the formation by means of production well 5 is continued until steam breakthrough occurs at the production well. Thereafter, steam injection is temporarily terminated. Although steam is injected into the full vertical thickness of the formation, it can be seen that due to uneven permeability distribution in the formation 1, the upper high permeability zone 2 of the formation is swept by steam whereas the lower low permeability zone 3 is basically unswept. Once the high permeability zone 2 has been entirely swept by steam to establish a connection between the injection well 4 and production well 5, further injection of steam into the formation will result in steam passing only through steam-swept zone 2a of the formation and consequently displacing very little additional oil from the lower zone 3 of the formation, thereby causing oil production to drop to levels that are not economic. The placement of gelled polymers into the steam swept portion of the formation and removal of ungelled polymer from the less permeable unswept portion of the formation in the vicinity of the injection well can allow subsequently injected steam to invade a greater portion of the formation.

Figure 1B:
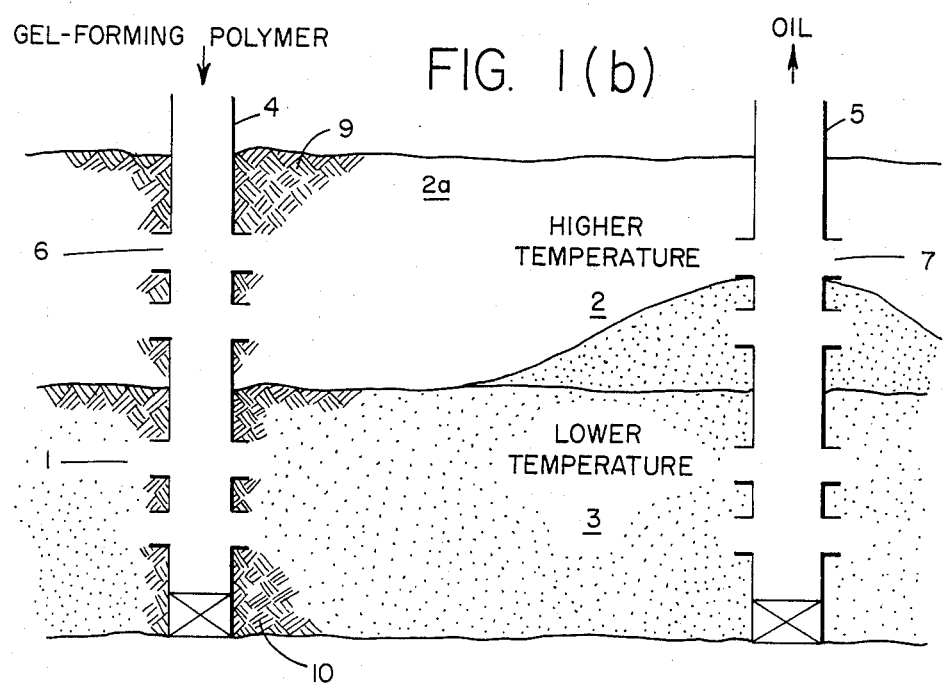
Figure 2:
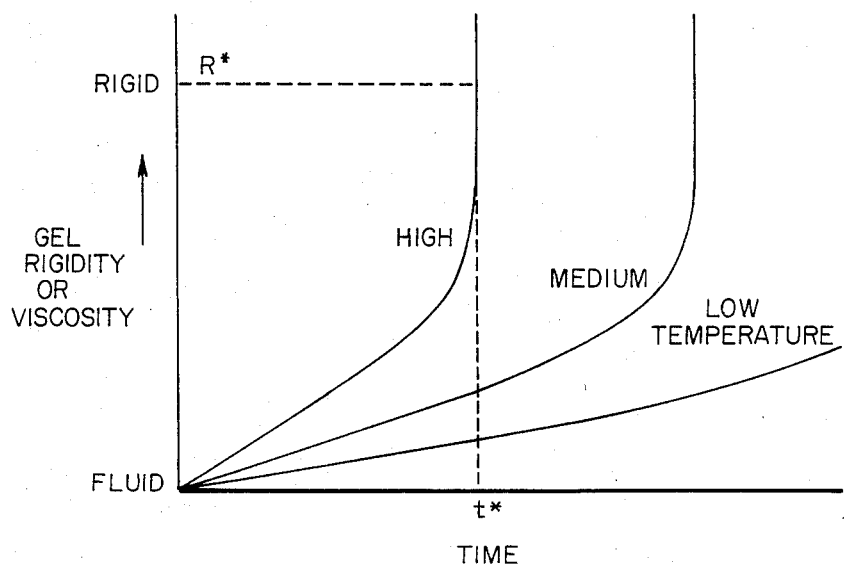
FIG. 2 illustrates the relationship between gel rigidity or viscosity and gel time at various temperatures for a typical temperature selective gel-forming solution.

The process of our invention is illustrated by referring to FIGS. 1(b), 1(c) and 1(d). A quantity of a temperature selective gel-forming solution which forms a rigid gel according to a desired gelation kinetics is then injected into the formation 1 through injection well 4. The quantity of the temperature selective gel-forming solution required is that amount sufficient to extend into the highly permeable zone a distance equal to at least 5 to 30% of the pore volume of the highly permeable zones between the injection well and the production well. This amount will vary depending upon the porosity, thickness and oil and water saturation of the formation treated. The preferred volume of the temperature selective gel-forming solution injected into the formation will depend upon formation characteristics and the degree of plugging desired. The gelation kinetics of the polymer system is such that the rate of formation of gel is much accelerated at high temperatures (300° F. or higher) such as those found in steam flooding as illustrated in FIG. 2. The temperature selective gel-forming polymer is allowed to gel in the formation. Because the temperature distribution in the formation is nonuniform, the polymers will gel at different rates. The polymers in the hotter, steam-swept zone 2a of the formation will gel much faster than the polymers in the cooler, less permeable unswept zone 3 of the formation. As illustrated in FIG. 1(b), a greater amount of the thermal selective gel-forming polymer migrates into the highly permeable zones of the formation thereby creating a larger gel zone 9 in the upper steam-swept portion of the formation than the gel zone 10 in the lower, less permeable unswept portion 3 of the formation in the vicinity of the injection well. The distance that the ungelled polymer extends from the injection well into the formation will depend upon the volume of polymer injected into the formation and the ratio of the permeabilities of the high permeable zones to the low permeable zones and the thickness of each zone. Once the desired quantity of polymer has been injected into the formation, a predetermined period of time ($t^*$) is allowed to permit the polymers in the upper steam-swept zone 2a of the formation having higher temperatures to gel to a desired rigidity ($R^*$) whereas the polymers in the cooler zone 10 (unswept by steam) of the formation are still fluid. The rigidity can be measured in terms of gel viscosity or by other empirical or visual means. The gelling time ($t^*$) to obtain the desired rigidity ($R^*$) as a function of formation temperature for a typical temperature selective polymer system is illustrated in FIG. 2. After a predetermined period of time ($t^*$) to allow the polymers in gel zone 9 to form a rigid gel, injection well 4 is put on production to remove the ungelled polymer from gel zone 10 of the less permeable unswept portion of the formation in the vicinity of the injection well. Gels with rigidity less than $R^*$ can be produced back through the injection well, resulting in selectivity plugging only the steam-swept zone 2a of the formation as illustrated in FIG. 1(c). Thereafter, steam injection into the formation via injection well 4 is resumed and fluids including oil are recovered from the formation via production well 5 until the amount of oil recovered is unfavorable. The rigid gel in gel zone 9 selectivity reduces the permeability of the steam-swept zone 2a and diverts subsequently injected steam to the previously unswept zone 3 to displace additional oil for improved oil recovery as illustrated in FIG. 1(d).

Examples of temperature selective gel-forming solutions useful in the present invention include polyacrylamides with varying degrees of hydrolysis, preferably not exceeding 30% hydrolysis. Copolymers containing an acrylamide unit can also be used if the molecular ratio of acrylamide comonomer is at least 70%. The molecular weight of polyacrylamide and polyacrylamide copolymers should be at least 10,000 to be useful and preferably in the range of about one million to about twenty million and most preferably in the range of ten to twenty million. Extremely high molecular weight materials may cause difficulties in polymer solubilization, in pumping and in injecting these gelling mixtures due to high viscosity.

Concentrations of polymers in these aqueous gelling mixtures is between 0.5-10% depending on the polymer molecular weight and desired gel properties. Lower molecular weight polymers require higher polymer concentration to form a gel. For a given polymer molecular weight, stronger and more stable gels are formed at higher polymer concentrations.

Crosslinkers used are phenol-formaldehyde resins formed in-situ or commercially available resol resins. Formaldehyde to phenol molar ratios are from about 1:1 to about 4:1 and preferably 3:1 to 4:1. The phenol concentration varies from about 2% to about 20% and in preferably about 3% to about 10%. Rigid and more thermally stable gels are formed at higher phenol concentrations. Normally, 2% to 10% phenol is used. Other types of phenolic resin compositions can also be used such as, cresol, catechol, naphthol, alkyl-substituted phenol, bisphenols-A, etc., to achieve special properties. Examples of a preferred polymer is polyacrylamide with a low degree of hydrolysis (less than 5%) with a molecular weight below 20 million.

Figure 3:
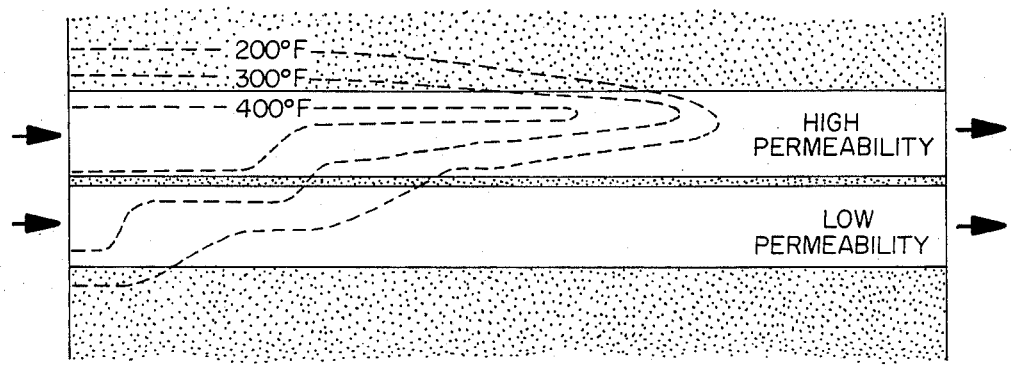
FIG. 3 shows the temperature distribution for a steam flood in a subterranean formation having varying permeabilities.

An example of temperature distribution in a reservoir subjected to steam flooding until steam breakthrough occurs is shown in FIG. 3. A polymer system can be designed such that polymers gel rapidly at temperatures above 350° F. Below 350° F., gelation takes place much more slowly. In the following example, a polyacrylamide-phenol-formaldehyde system is used. The composition of this gel system is 2% 900N, unhydrolyzed high molecular weight polyacrylamide sold by American Cyanamid, 3% phenol and 3.9% formaldehyde. The following table shows the gellation kinetics.

| Time, days | Temperature, °F. | | |
|---|---|---|---|
| | 210 | 300 | 400 |
| 1 | Not gelled | Soft and mobile gel | Solid gel |
| 2 | Not gelled | Soft and mobile gel | |

$t^*$ in this example is about 1 day. Therefore, after injecting the polymer system, the injection well is shut in for about 1 day. Afterwards, the injection well is backflowed and only the part of the reservoir at temperatures above 350° F. is plugged with solid gel. The polymers in other parts of the reservoir do not form solid gel and can be pumped out via the injection well.

In another embodiment of the invention, the process of the present invention can also be applied to a steam drive process in any formation to reduce steam override thereby improving sweep efficiency. The problem of steam override is described in U.S. Pat. No. 4,444,261 to Islip, the disclosure of which is hereby incorporated by reference. In a steam drive oil recovery process, steam is considerably lighter than the oil and water present in the formation and thus, because of gravity segregation, it tends to rise to the top of the formation until vertical communication exists. Consequently, the injected steam channels through the top of the formation to the producing well overriding a major portion of the formation and contacting only a small fraction of the formation oil. Once steam override has occurred, steam override inevitably leads to early steam breakthrough and afterwards continued injection of steam into the formation will accomplish very little additional oil recovery. This behavior results in an inefficient oil recovery and low vertical sweep efficiency. Using the present process, once steam breakthrough occurs at the production well thereby forming a steam swept zone in the formation due to steam override, injection of steam is terminated and a predetermined amount of a temperature selective gel-forming solution is injected into the formation that preferentially enters the steam-swept zone. Thereafter, sufficient time is allowed to permit the gel-forming solution to form a rigid gel in the steam-swept zone thereby effectively plugging the steam-swept zone.

Thereafter, the injection well is put on production to remove the ungelled polymers. Thereafter, steam injection into the formation is resumed via the injection well and fluids including oil are recovered from the formation through the production well. Once steam breakthrough has again occurred at the production well, another predetermined amount of temperature selective gel-forming solution is injected into the formation and allowed to set for a predetermined period of time to form a rigid gel in the previously steam-swept zone. Ungelled solution is again removed from the formation via the injection well and steam injection can once again be initiated to further sweep oil from the formation below the second slug of gel-forming solution. The process should be continued through repetitious cycles thereby resulting in sweeping oil from a very significant percentage of the formation.

In still another embodiment, the process of our invention may be applied to a cyclic steam stimulation process in a subterranean, viscous oil-containing formation containing zones of varying permeability penetrated by at least one well in fluid communication with a substantial portion of the formation. Initially, a predetermined amount of steam is injected into the formation via the well that preferentially penetrates the relatively high permeability zones of the formation to form a steam-swept zone and to heat the viscous oil and reduce its viscosity. Thereafter, fluids including oil are produced from the well until the amount of oil recovered is unfavorable. If desired, a soak period may be utilized between steam injection and the production cycle. Thereafter, a predetermined amount of a temperature selective gel-forming solution is injected into the formation via the well that preferentially enters the steam-swept zone. The quantity of the temperature selective gel-forming solution required is that amount equal to 10 to 50% of the amount of oil produced in the prior production cycle. Thereafter, sufficient time is allowed to permit the gel-forming solution to form a rigid gel in the steam-swept zone thereby effectively plugging the steam-swept zone. Thereafter, ungelled gel-forming solution is recovered from the formation via the well. In the next step, a predetermined amount of steam is injected into the formation that is diverted from the previously steam-swept zones into the lower, permeable unswept zones of the formation thereby heating additional oil and reducing its viscosity. Thereafter, after a soak period, if one is used, is completed, fluids including oil are produced from the formation via the well until the amount of oil recovered is unfavorable. Multiple cycles of steam injection, production, plugging of the steam-swept zones with the temperature selective gel-forming solution and removal of the ungelled solution followed by steam injection and production may be repeated for a plurality of cycles until the amount of oil recovered is unfavorable.

By the term "pore volume" as used herein, is meant that volume of the portion of the formation underlying the well pattern employed as described in greater detail in U.S. Pat. No. 3,927,716 to Burdyn et al., the disclosure of which is hereby incorporated by reference.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716 to Burdyn et al.

From the foregoing specification, one skilled in the art can readily ascertain the essential features of this invention and without departing from the spirit and scope thereof can adapt it to various diverse applications. It is our intention and desire that our invention be limited only by those restrictions or limitations as are contained in the claims appended immediately hereinafter below.

We claim:

1. A method for recovering oil from a subterranean, viscous oil-containing formation having relatively high permeability zones and relatively low permeability zones penetrated by at least one injection well and at least one spaced-apart production well, said wells being in fluid communication with a substantial portion of the formation comprising:

(a) injecting a high temperature medium into the formation via said injection well that preferentially enters the high permeability zones and recovering fluids including oil from the formation via said production well until breakthrough of the high temperature medium occurs at the production well thereby forming a thermally-swept zone in the formation, said thermally-swept zone having a temperature in excess of 350° C. in the vicinity of the injection well;

(b) injecting a predetermined amount of a high temperature selective gel-forming solution comprising an aqueous solution of high molecular weight polyacrylamide with 30% or less hydrolysis mixed with phenol and formaldehyde into the formation via the injection well in sufficient amount to flow into said thermally-swept zones and allowing said solution to set in said high thermally-swept zones to form a rigid gel therein thereby plugging said zones, said gel-forming solution capable of forming a rigid gel in the thermally-swept zones at temperatures above 350° F.;

(c) recovering ungelled gel-forming solution from the formation in the vicinity of the injection well via said injection well; and (d) thereafter injecting the high temperature flooding medium into the formation via the injection well and recovering fluids including oil from the formation via the production well.

2. A method according to claim 1 wherein the high molecular weight polyacrylamide is hydrolyzed 5% or less.

3. A method according to claim 1 wherein the molecular weight of the polyacrylamide is below 20 million.

4. A method according to claim 1 wherein the molecular weight of the polyacrylamide is from about 10 million to about 20 million.

5. A method according to claim 1 wherein the phenol concentration is from about 3% to about 10% and the ratio of phenol to formaldehyde is from about 3:1 to about 4:1.

6. A method according to claim 1 wherein the concentration of polyacrylamide, phenol and formaldehyde is from about 1% to about 5%.

7. A method for recovering oil from a subterranean, viscous oil-containing formation penetrated by at least one injection and at least one spaced-apart producton well, said wells being in fluid communication with a substantial portion of the formation comprising:

(a) injecting steam into the formation and producing fluids, including oil, from the formation via the production well until steam breakthrough occurs at the production well thereby forming a steam-swept zone in the formation, said steam-swept zone having a temperature in excess of 350° F. in the vicinity of the injection well;
(b) injecting a predetermined amount of a high temperature selective gel-forming solution comprising an aqueous solution of high molecular weight polyacrylamide with 30% or less hydrolysis mixed with phenol and formaldehyde into the steam-swept zone, said gel-forming solution capable of forming a rigid gel in the steam-swept zones at temperatures above 350° F.;
(c) allowing the injected gel-forming solution to set within the formation for a predetermined period of time until it forms a rigid gel in the steam-swept zone;
(d) recovering ungelled solution from the formation via the injection well; and
(e) thereafter injecting steam into the formation via the injection well and recovering fluids, including oil, from the formation via the production well.

8. A method according to claim 7 wherein the high molecular weight polyacrylamide is hydrolyzed 5% or less.

9. A method according to claim 7 wherein the molecular weight of the polyacrylamide is below 20 million.

10. A method according to claim 7 wherein the molecular weight of the polyacrylamide is from about 10 million to about 20 million.

11. A method according to claim 7 wherein the phenol concentration is from about 3% to about 10% and the ratio of phenol to formaldehyde is from about 3:1 to about 4:1.

12. A method according to claim 7 wherein the concentration of polyacrylamide, phenol and formaldehyde is from about 1% to about 5%.

13. A method for recovering oil from a subterranean, viscous oil-containing formation having relatively high permeability zones and relatively low permeability zones penetrated by at least one well that is in fluid communication with a substantial portion of the formation comprising:
(a) injecting a predetermined amount of steam into the formation via said well that preferentially enters the high permeability zones to form a steam-swept zone in the formation, said steam-swept zone having a temperature in excess of 350° F. in the vicinity of the injection well;
(b) producing fluids including oil from the formation via said well until the amount of oil recovered is unfavorable;
(c) injecting a predetermined amount of a high temperature-selective gel-forming solution comprising an aqueous solution of high molecular weight polyacrylamide with 30% or less hydrolysis mixed with phenol and formaldehyde into the formation via said well in a sufficient amount to flow into the steam-swept zones and allowing said solution to set in said steam-swept zones to form a rigid gel therein thereby plugging said zones, said gel-forming solution capable of forming a rigid gel in the steam-swept zones at temperatures above 350° F.;
(d) recovering ungelled gel-forming solution from the formation via said well;
(e) injecting a predetermined amount of steam into the formation via said well that preferentially enters the low permeable unswept portion of the formation; and
(f) producing fluids including oil from the formation via said well until the amount of oil recovered is unfavorable.

14. A method according to claim 13 wherein the high molecular weight polyacrylamide is hydrolized 5% or less.

15. A method according to claim 13 wherein the molecular weight of the polyacrylamide is below 20 million.

16. A method according to claim 13 wherein the molecular weight of the polyacrylamide is from about 10 million to about 20 million.

17. A method according to claim 13 wherein the phenol concentration is from about 3% to about 10% and the ratio of phenol to formaladehyde is about 3:1 to about 4:1.

18. A method according to claim 13 wherein the concentration of polyacrylamide phenol and formaldehyde is from about 1% to about 5%.

* * * * *